Oct. 26, 1948.  F. DUNHAM  2,452,360
SOLDERING GUN
Filed Dec. 23, 1946
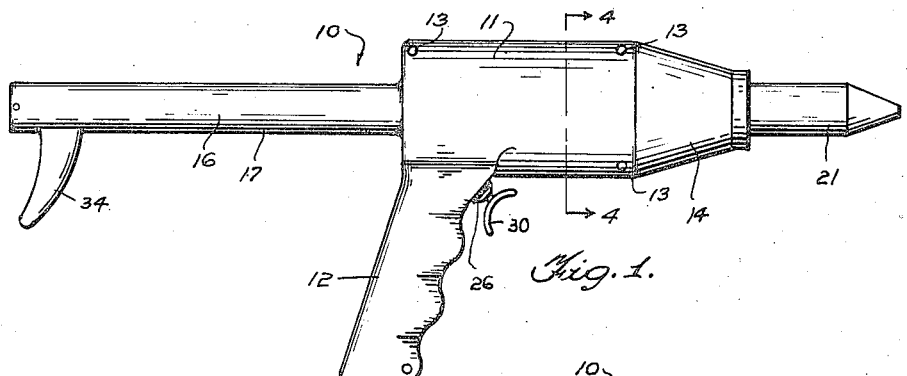
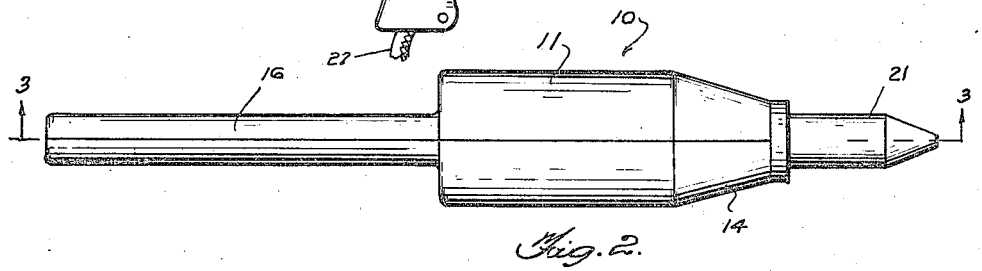
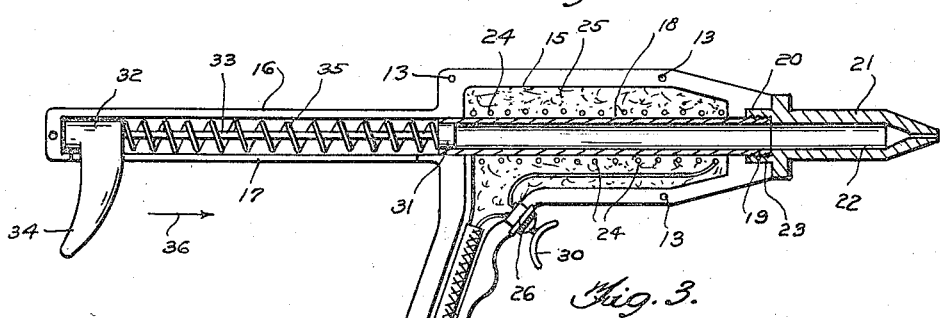
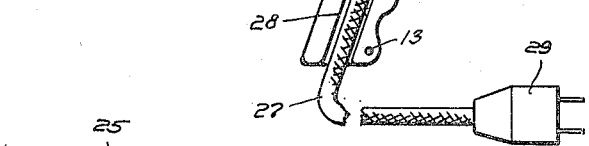
Inventor
Frank Dunham
By Clarence A. O'Brien
and Harvey B. Jackson
Attorneys Patented Oct. 26, 1948

2,452,360

UNITED STATES PATENT OFFICE 2,452,360

SOLDERING GUN

Frank Dunham, Grand Island, Nebr., assignor of fifty per cent to John F. McCarthy, Grand Island, Nebr.

Application December 23, 1946, Serial No. 717,947

1 Claim. (Cl. 219—27)

This invention relates to new and useful improvements and structural refinements in soldering guns, and the principal object of the invention is to provide a device of the character herein described which embodies in its construction an electrically heated solder magazine and in which means are provided for easily and conveniently ejecting the liquefied solder from the magazine through the soldering tip.

A further object of the invention is to provide a soldering gun which is simple in construction and which may be easily manipulated.

Another object of the invention is to provide a soldering gun which may be held and manipulated with only one hand, thereby eliminating the previously experienced inconvenience of holding the conventional soldering iron in one hand, the solder in the other.

An additional object of the invention is to provide a soldering gun which will not easily become damaged and which is otherwise well adapted for the purpose for which it is intended.

A still further object of the invention is to provide a soldering gun which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention.

Figure 2 is a top plan view thereof.

Figure 3 is a cross sectional view, taken substantially in the plane of the line 3—3 in Figure 2, and Figure 4 is a cross sectional view, taken substantially in the plane of the line 4—4 in Figure 1.

Like characters of reference are used to designate like parts in the specification and throughout the several views.

Referring now to the accompanying drawings in detail, the invention consists of a soldering gun designated generally by the reference character 10, the same embodying in its construction an elongated, substantially cylindrical body 11 provided at one end thereof with a laterally projecting handle 12. In effect, the body 11 and the associated handle may be formed in two complemental sections, these being secured together by a plurality of suitable bolts or screws 13, whereby the assembly or disassembly of the soldering gun will be facilitated.

The remaining end of the body 11 is of a substantially frusto-conical configuration as indicated at 14, and a longitudinally extending chamber 15 is formed in the body, as will be clearly apparent from the accompanying drawings.

A cylindrical sleeve 16 extends longitudinally from the handle end of the body 11 and may, if desired, be formed integrally therewith. The sleeve is formed on the underside thereof with a longitudinally extending slot 17 and the purpose thereof will be hereinafter more fully described.

A tubular solder magazine 18 extends longitudinally in the chamber 15, one end of the magazine communicating with the sleeve 16, while its remaining end terminates in a screw threaded portion 19 which is disposed in a counter-bore 20 formed in the end portion 14 of the body 11.

A soldering tip 21 is provided with an outlet passage 22 and with an internally threaded adaptor 23, the latter being receivable in the counter-bore 20 and being adapted to engage the threaded portion 19 of the magazine 18. It will be noted that the passage 22 of the soldering tip is, of course, in communication with the magazine, as is best shown in Figure 3.

A helical electric heating element 24 is wound around the outer wall of the magazine 18 in the chamber 15, the element being adapted for heating both the magazine and the soldering tip 21, the latter function being performed through the medium of the connecting adaptor 23. Packing of suitable heat insulating material 25 is provided in the chamber 15, thereby preventing dissipation of heat from the element 24 to the body 11.

One end of the element 24 is electrically connected to a suitable switch 26 mounted on the body 11 adjacent the handle 12, the remaining end of the element and the second wire of the switch uniting to form a conductor 27.

The cable 27 passes outwardly through a bore 28 provided in the handle 12 and the usual attachment plug 29 is positioned at the free end of the cable, for obvious reasons. If desired, the switch 26 may be equipped with a trigger-like finger piece 30, as will be clearly apparent from the accompanying drawings.

A plunger 31 is slidable in the magazine 18 and a further plunger 32 is slidably positioned in the sleeve 16. The two plungers are rigidly connected together by a push rod 33 and the plunger 32 is provided with an arcuate finger piece 34 which extends laterally through the aforementioned slot 17. Finally, a suitable compression spring 35 is interposed between the plunger 32 and the adjacent end of the magazine 18, as will be clearly understood.

When the invention is placed in use, solder positioned in the magazine 18 will be melted by the element 24, the operation of the latter being effectively controlled by the switch 26. The liquefied solder may be easily and conveniently ejected from the magazine through the outlet passage 22 of the tip 21 by simply sliding the finger piece 34 in the direction of the arrow 36, and thereby correspondingly sliding the plunger 31.

The spring 35 will, of course, normally retain the plunger 31 at the extreme end of the magazine 18 as shown in Figure 3 and when the supply of solder in the magazine 18 has been exhausted, the same may be replenished by simply removing the tip 21.

It should be understood that a plurality of soldering tips may be used in association with the gun, the same being configurated in accordance with the particular requirements of the work.

It will be also noted that the soldering gun may be held and manipulated with only one hand, by simply gripping the handle 12. The switch 26 may be actuated by extending the fore finger into engagement with the finger piece 30, while the solder may be ejected through the passage 22 by extending the thumb into engagement with the finger piece 24.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A soldering gun comprising in combination, an elongated body formed with a longitudinally extending chamber, a laterally projecting handle at one end of said body, a tubular solder magazine extending longitudinally through said chamber, a soldering tip removably positioned at the remaining end of said body and in contact with the adjacent end of said magazine, an electric heating element positioned in said chamber and surrounding said magazine, packing of heat insulating material provided in said chamber, said tip being formed with an outlet passage communicating with said magazine, a switch provided on said body adjacent said handle, a current conductor extending through said handle and being connected to said element and to said switch, a longitudinally slotted sleeve provided at the handle end of said body, a push rod in said sleeve, a plunger slidable in said magazine and secured to one end of said push rod, a finger piece at the remaining end of said push rod, said finger piece extending slidably through the slot in said sleeve, and a compression spring between said finger piece and the adjacent end of said magazine.

FRANK DUNHAM.

REFERENCES CITED

The following references are of record in the file of this patent:

UNITED STATES PATENTS

| Number | Name | Date |
|---|---|---|
| 1,957,325 | Davis | May 1, 1934 |
| 2,094,795 | Johnson | Oct. 5, 1937 |
| 2,380,138 | Abramson | July 10, 1945 |